US008864303B2

(12) United States Patent
Huang

(10) Patent No.: US 8,864,303 B2
(45) Date of Patent: Oct. 21, 2014

(54) MULTIFUNCTIONAL PRINTER AND AUTOMATICALLY OPENING OR CLOSING COVER DEVICE

(75) Inventor: Chien-Hsing Huang, New Taipei (TW)

(73) Assignees: Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 4 days.

(21) Appl. No.: 13/615,614

(22) Filed: Sep. 14, 2012

(65) Prior Publication Data

US 2014/0022324 A1    Jan. 23, 2014

(30) Foreign Application Priority Data

Jul. 18, 2012    (TW) .............................. 101125884 A

(51) Int. Cl.
*B41J 29/13*    (2006.01)
(52) U.S. Cl.
USPC ......................................................... 347/108
(58) Field of Classification Search
CPC . E05B 3/003; E05B 47/0004; E05B 47/0673; E05B 73/0082; E05B 81/14; E05B 81/16; E05B 81/20; B25B 21/00; F16H 2007/0855; F16H 19/043; F16H 19/04; F16H 2007/0823
USPC .................... 347/108; 74/29; 70/58; 292/138
See application file for complete search history.

(56) References Cited

U.S. PATENT DOCUMENTS

| | | | | |
|---|---|---|---|---|
| 5,406,859 A | * | 4/1995 | Belford | 74/31 |
| 5,741,040 A | * | 4/1998 | Gebauer et al. | 296/97.2 |
| 6,540,268 B2 | * | 4/2003 | Pauser | 292/48 |
| 6,783,231 B1 | * | 8/2004 | Kim | 347/108 |
| 2008/0315739 A1 | * | 12/2008 | Hirano | 312/330.1 |
| 2009/0289057 A1 | * | 11/2009 | Yoshidome | 219/725 |
| 2009/0323138 A1 | * | 12/2009 | Lee | 358/474 |
| 2010/0079285 A1 | * | 4/2010 | Fawcett et al. | 340/568.1 |
| 2010/0295234 A1 | | 11/2010 | Liu | |

FOREIGN PATENT DOCUMENTS

WO    WO 2009147866 A1 * 12/2009 ................ B60J 5/06

OTHER PUBLICATIONS

Ching-Feng Lin, "Multi-Function Printer", U.S. Appl. No. 13/227,478, filed Sep. 8, 2011, pp. 1-15.
Ching-Feng Lin, "Multi-Function Printer", U.S. Appl. No. 13/267,892, filed Oct. 7, 2011, pp. 1-17.
Shi-Ze Liu, "Multi-Function Printer", U.S. Appl. No. 13/267,894, filed Oct. 7, 2011, pp. 1-25.

* cited by examiner

*Primary Examiner* — Matthew Luu
*Assistant Examiner* — Patrick King
(74) *Attorney, Agent, or Firm* — Jianq Chyun IP Office

(57) ABSTRACT

A multifunctional printer and an automatically opening or closing cover device are provided. The multifunctional printer includes a main body and the automatically opening or closing cover device. The main body includes a housing and a cover pivoted to the housing, wherein the housing includes an opening. The cover includes a first protrusion and a second protrusion protruding to the inner of the housing and being located in the opening. The automatically opening or closing cover device is disposed in the main body and includes a gear and a sliding element. The sliding element includes a body portion, a driving portion and a driven portion, wherein the driving portion and the driven portion are disposed on opposite sides of the body portion, and the driving portion engages with the gear.

10 Claims, 9 Drawing Sheets

MULTIFUNCTIONAL PRINTER AND AUTOMATICALLY OPENING OR CLOSING COVER DEVICE

CROSS-REFERENCE TO RELATED APPLICATION

This application claims the priority benefit of Taiwan application serial no. 101125884, filed on Jul. 18, 2012. The entirety of the above-mentioned patent application is hereby incorporated by reference herein and made a part of this specification.

BACKGROUND

1. Field of the Invention

The invention relates to a multifunctional printer and an automatically opening or closing cover device, and more particularly, to a multifunctional printer using an automatically opening or closing cover device.

2. Description of Related Art

As the information society arrives, office automation equipment such as scanners, photocopiers or printers are disposed in offices, and users may perform secretarial processing operations using the office automation equipment. It should be noted that when disposed in the office, the aforesaid various kinds of office automation equipment occupy a great deal of space. As a result, a multi-function peripheral (MFP) integrated with functions such as copying, printing, and scanning is developed to resolve the above problem.

In current MFPs, most of the covers relative to housings may be opened automatically through the control of software or mechanism so as to allow the output of papers, but the covers require to be manually closed by the users.

SUMMARY OF THE INVENTION

The invention provides a multifunctional printer with an automatically opening or closing cover device.

The invention provides an automatically opening or closing cover device applied in the multifunctional printer.

The invention provides a multifunctional printer including a main body and an automatically opening or closing cover device. The main body includes a housing and a cover pivoted to the housing. The housing includes an opening. The cover includes a first protrusion and a second protrusion protruding to the inner of the housing and being located in the opening. The automatically opening or closing cover device is disposed in the main body and includes a gear and a sliding element. The sliding element includes a body portion, a driving portion and a driven portion, wherein the driving portion and the driven portion are disposed on opposite sides of the body portion, and the driving portion engages with the gear. When the gear rotates towards a first direction, the driving portion is driven by the gear and makes the sliding element move towards a cover opening direction; the driven portion of the sliding element props against the first protrusion of the cover, so that the cover is opened relative to the housing. When the gear rotates towards a second direction, the driving portion is driven by the gear and makes the sliding element move towards a cover closing direction; the driven portion props against the second protrusion of the cover, so that the cover is closed relative to the housing.

The invention further provides an automatically opening or closing cover device suitable for being applied in a multifunctional printer, and the multifunctional printer includes a main body. The automatically opening or closing cover device includes a gear and a sliding element. The sliding element includes a body portion, a driving portion and a driven portion, wherein the driving portion and the driven portion are disposed on opposite sides of the body portion, and the driving portion engages with the gear. When the gear rotates towards a first direction, the driving portion is driven by the gear and makes the sliding element move towards a cover opening direction; the driven portion of the sliding element props against a first protrusion of a cover of the main body, so that the cover is opened relative to a housing. When the gear rotates towards a second direction, the driving portion is driven by the gear and makes the sliding element move towards a cover closing direction; the driven portion props against a second protrusion of the cover, so that the cover is closed relative to the housing.

Based on the above, in the multifunctional printer and the automatically opening or closing cover device used therein, when the sliding element moves towards the cover opening direction, the driven portion props against the first protrusion of the cover, so that the cover is opened relative to the housing automatically; when the sliding element moves towards the cover closing direction, the driven portion props against the second protrusion of the cover, so that the cover is closed relative to the housing automatically.

In order to make the aforementioned features and advantages of the invention more comprehensible, embodiments accompanying figures are described in detail below.

BRIEF DESCRIPTION OF THE DRAWINGS

The accompanying drawings are included to provide further understanding and are incorporated in and constitute a part of this specification. The drawings illustrate exemplary embodiments and, together with the description, serve to explain the principles of the invention.

DESCRIPTION OF EMBODIMENTS

Though current multifunctional printers may achieve the function of automatically opening covers by using software in conjunction with mechanism, however, for users, the current multifunctional printers are still quite inconvenient because the users have to close the covers manually. Therefore, the function of automatically opening and closing the cover of a multifunctional printer is a technology to be developed with great demand currently. Embodiments are provided below to exemplify how to achieve the function of automatically opening and closing the cover of the multifunctional printer by using mechanism. Without departing from the spirit of the invention, persons of ordinary skill in the art may adjust the selection of elements according to actual design needs and achieve the effect of automatically opening and closing the cover of the multifunctional printer as well.

It should be mentioned that herein, directional or relative descriptions, such as in, out, up, down, left and right, are described according to relative positions of elements shown in drawings of corresponding embodiments and are not intended to limit the invention.

[First Embodiment]

Figure 1:
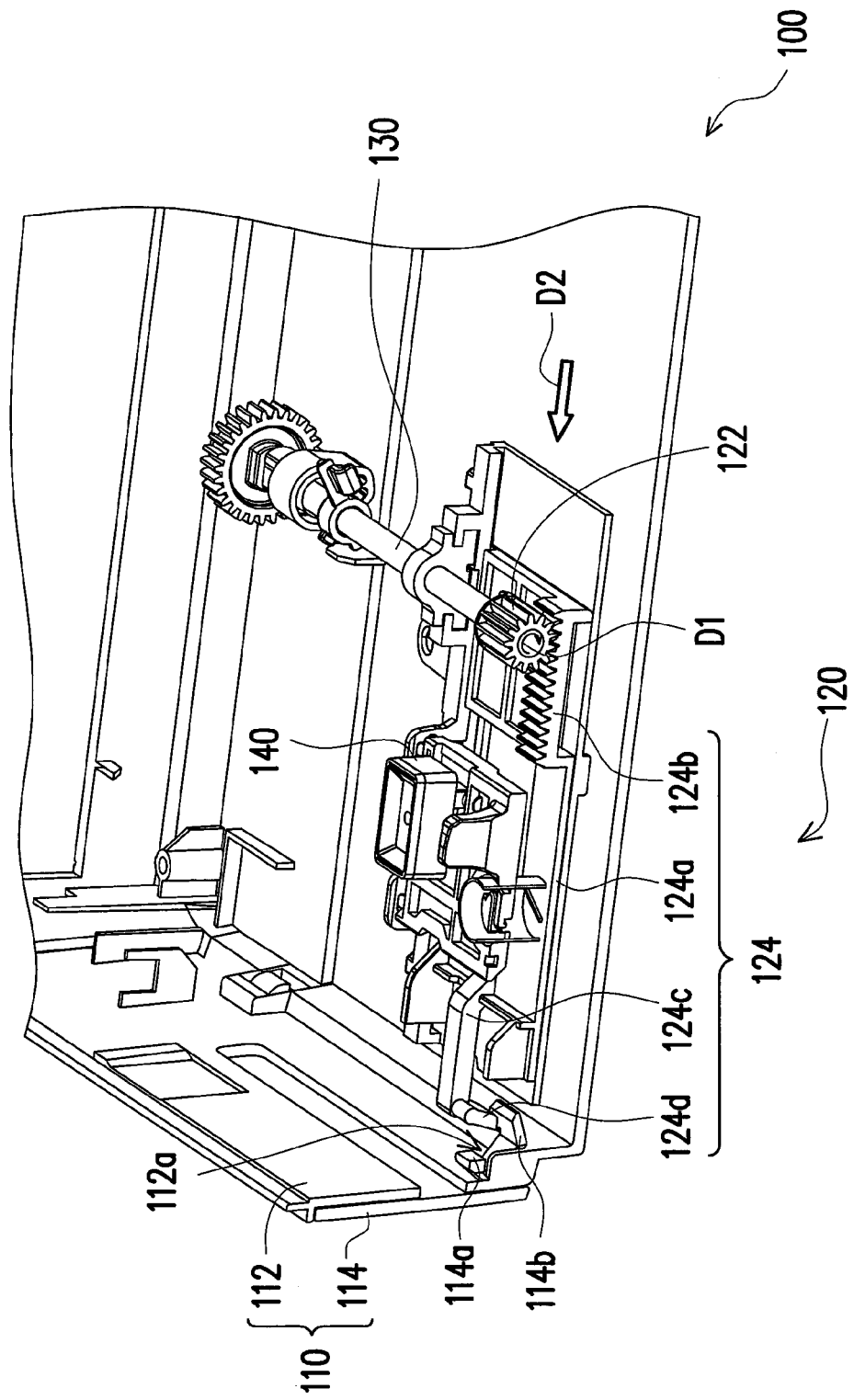
FIG. 1 is a schematic view of a multifunctional printer according to an embodiment of the invention.
Figure 2:
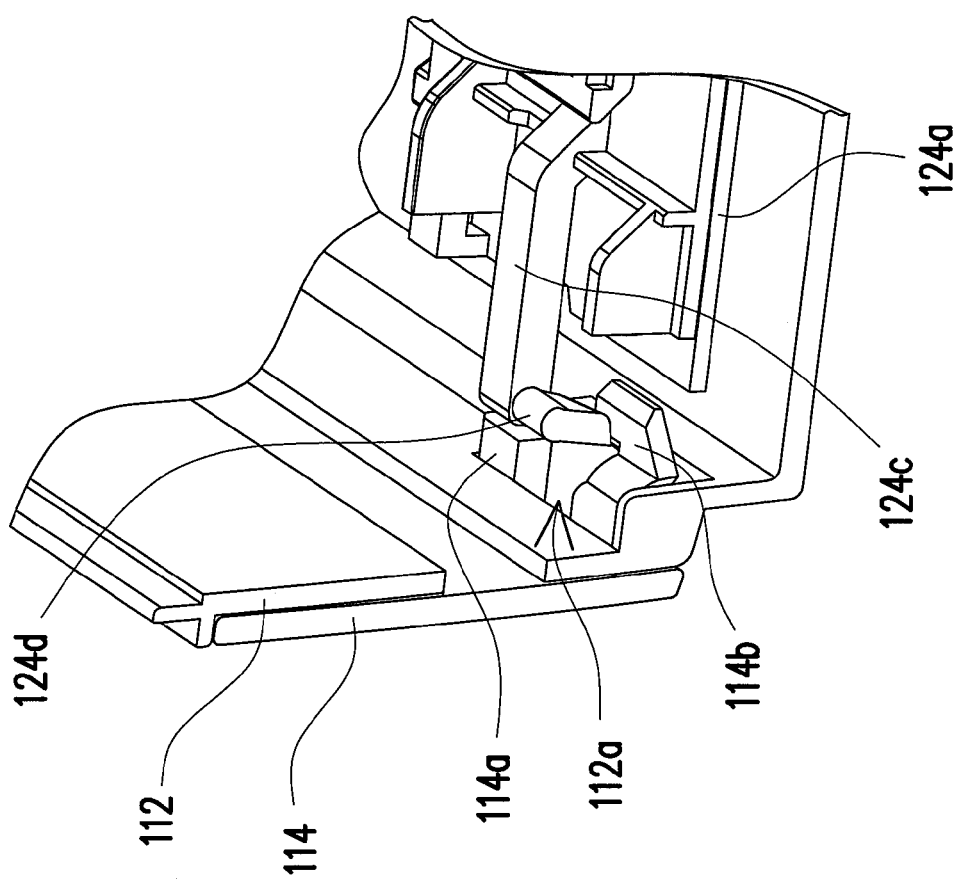
FIG. 2 is a schematic partial view of the multifunctional printer shown in FIG. 1.

FIG. 1 is a schematic view of a multifunctional printer according to an embodiment of the invention, and FIG. 2 is a schematic partial view of the multifunctional printer shown in FIG. 1. Referring to FIG. 1, a multifunctional printer 100 includes a main body 110 and an automatically opening or closing cover device 120. The main body 110 includes a housing 112 and a cover 114 pivoted to the housing 112. The housing 112 includes an opening 112a. The cover 114 includes a first protrusion 114a and a second protrusion 114b which protrude to the inner of the housing 112 and are located in the opening 112a. The automatically opening or closing cover device 120 is disposed in the main body 110 and includes a gear 122 and a sliding element 124. The sliding element 124 includes a body portion 124a, a driving portion 124b and a driven portion 124c, wherein the driving portion 124b and the driven portion 124c are disposed on opposite sides of the body portion 124a, and the driving portion 124b engages with the gear 122.

Based on the above, the driving portion 124b is a gear rack, and the driven portion 124c is a push rod. The driven portion 124c further includes an engaging end 124d for propping against the second protrusion 114b.

Referring to FIGS. 1 and 2, when the gear 122 rotates towards a first direction (a clockwise direction) D1, the driving portion 124b engaging with the gear 122 is driven by the gear 122 and makes the sliding element 124 move towards a cover opening direction D2; the driven portion 124c of the sliding element 124 props against the first protrusion 114a of the cover 114.

Figure 3:
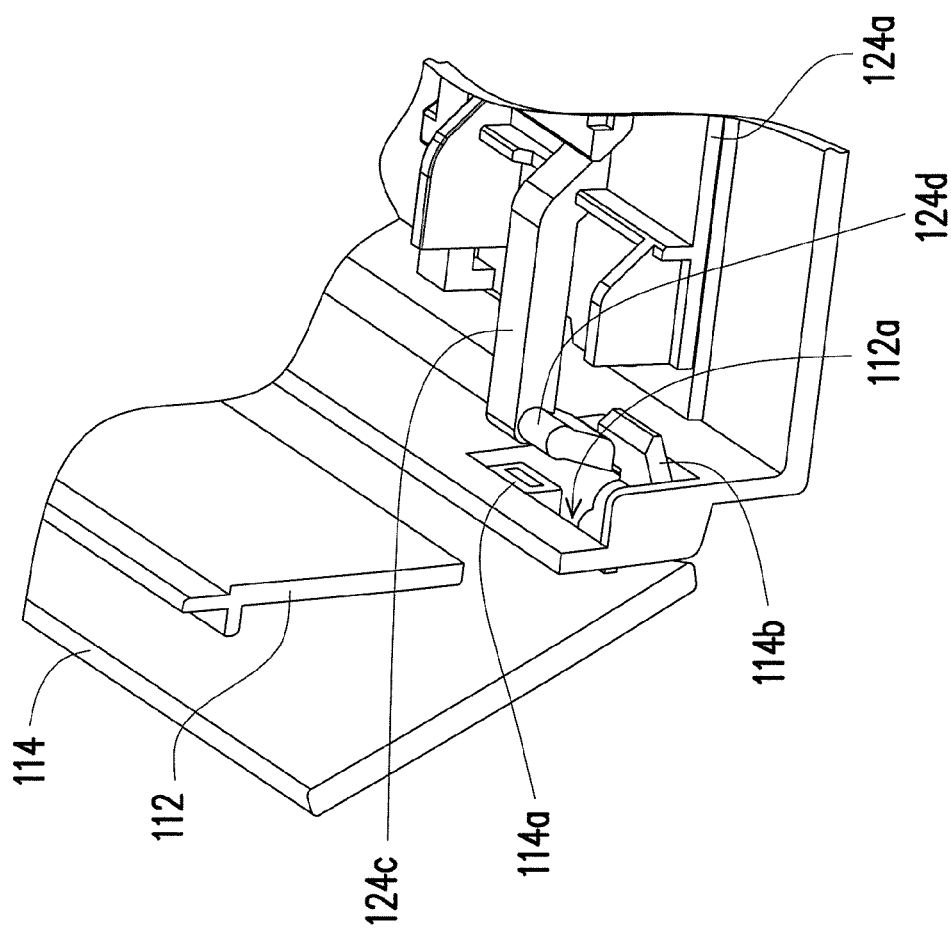
FIGS. 3 and 4 are schematic operational views of an automatically opening or closing cover device with a cover being opened.
Figure 4:
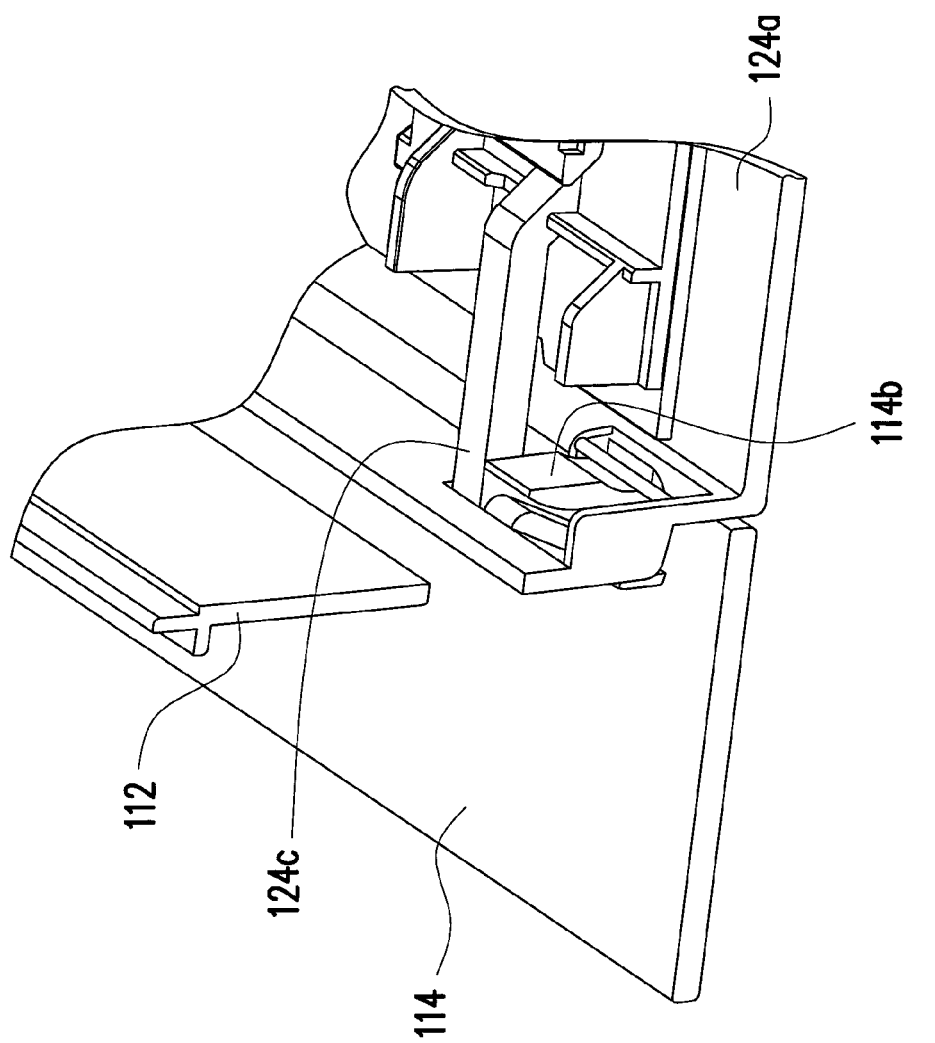

FIGS. 3 and 4 are schematic operational views of an automatically opening or closing cover device with a cover being opened. Referring to both FIGS. 1 and 3, the gear 122 keeps rotating to make the sliding element 124 keep moving towards the cover opening direction D2, and the driven portion 124c being the push rod keeps pushing the cover 114, so that the cover 114 is opened gradually relative to the housing 112.

Figure 5:
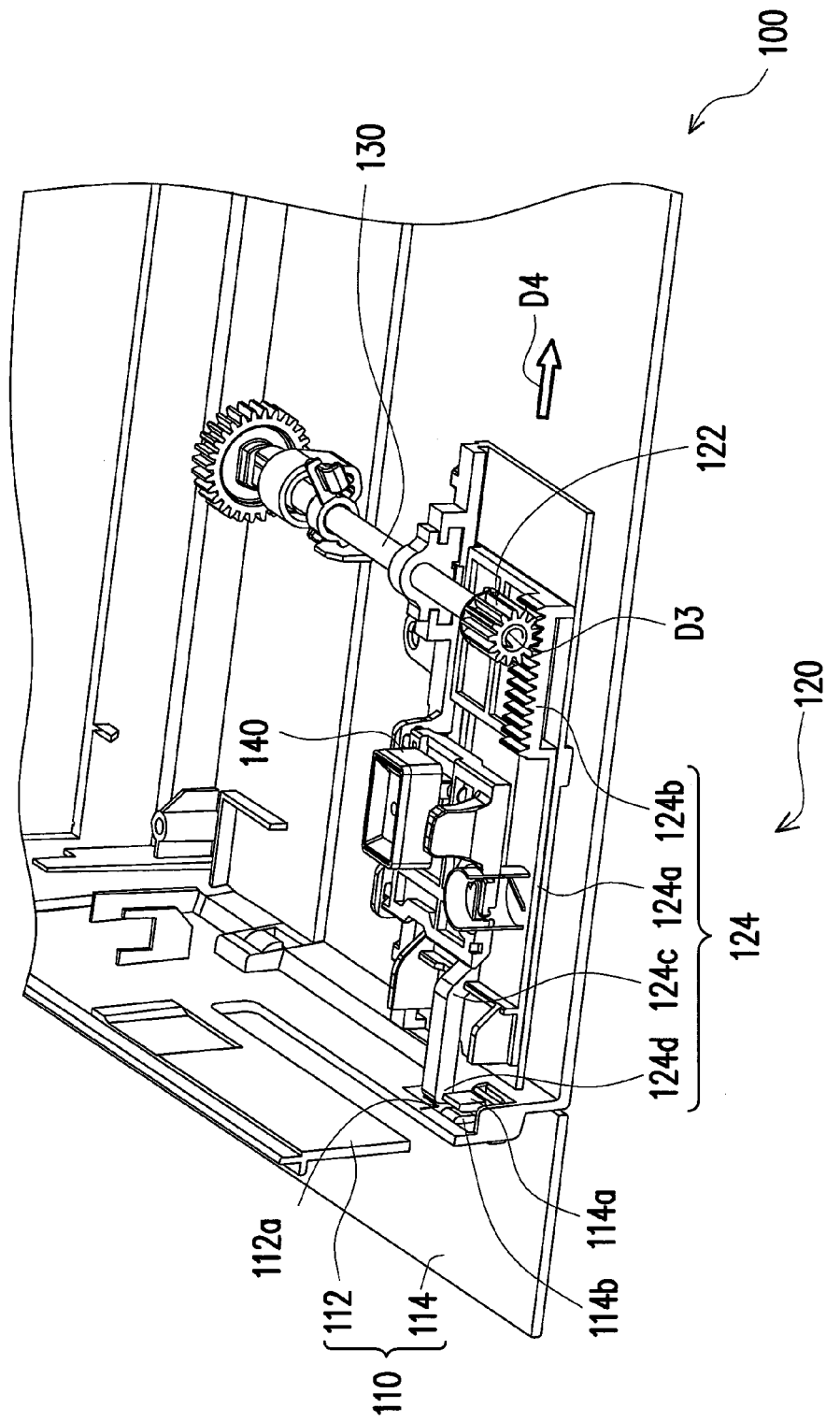
FIG. 5 is a schematic three-dimensional view of the cover being opened relative to a housing.
Figure 6:
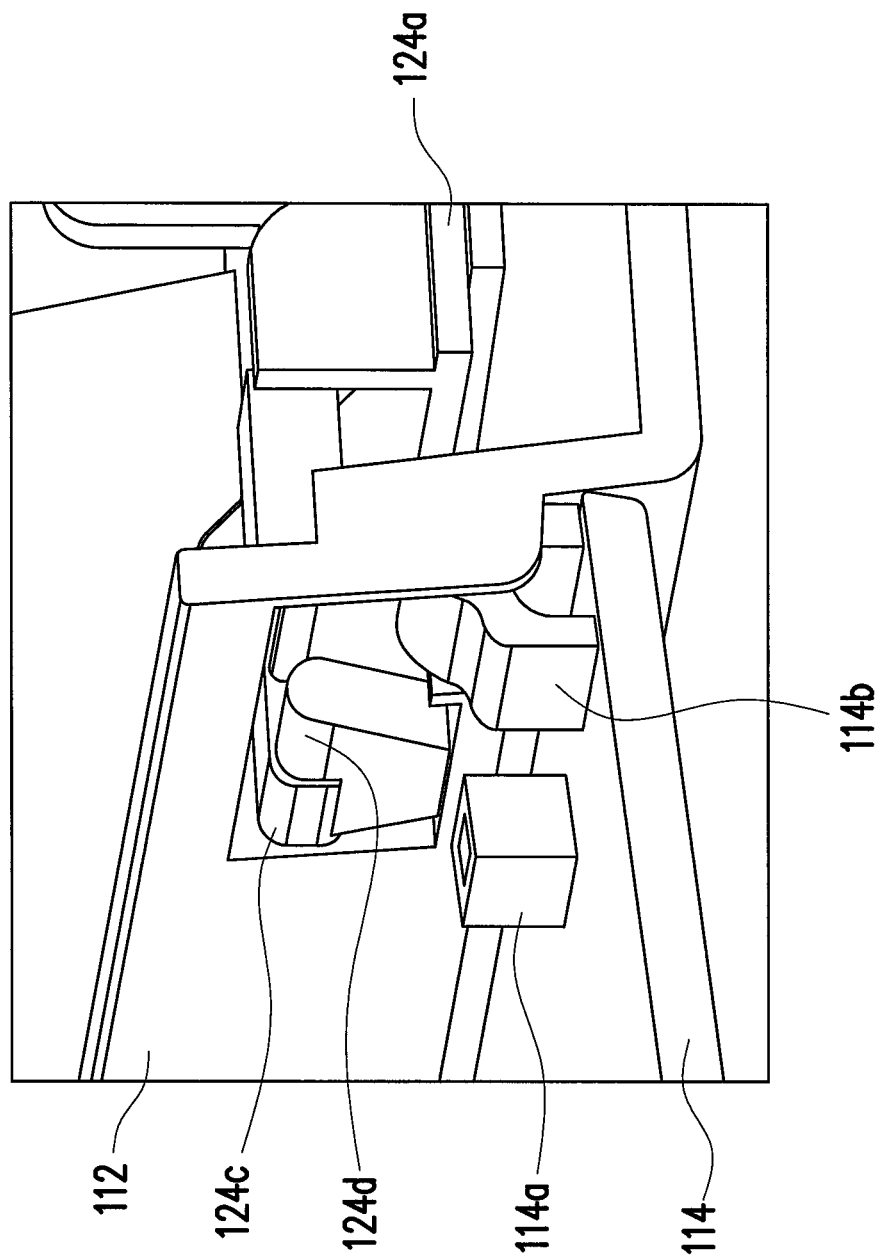
FIG. 6 is a schematic partial view of FIG. 5.

FIG. 5 is a schematic three-dimensional view of the cover being opened relative to the housing, and FIG. 6 is a schematic partial view of FIG. 5. Referring to both FIGS. 5 and 6, when the cover 114 is pushed by the driven portion 124c and opened relative to the housing 112 to a certain degree, a side of the cover 114 that is not pivoted to the housing 112 falls because of its own weight, so that the cover 114 is opened relative to the housing 112 at a large angle. At this time, the first protrusion 114a is released from a rear end of the driven portion 124c being the push rod with the rotation of the cover 114, and the engaging end 124d of the driven portion 124c is not in contact with the second protrusion 114b. The large angle indicated herein may be an included angle between a normal direction of the cover 114 and the cover opening direction D2 being 90 degrees or less than 90 degrees but greater than 30 degrees, so that the users may take papers carried on the cover 114. The aforesaid scope of the angle is merely exemplary and is not intended to limit the invention.

It should be mentioned that in the multifunctional printer 100 of the present embodiment, there is a distance between the first protrusion 114a and the second protrusion 114b, so the corresponding engaging end 124d and the rear end of the push rod are connected to each other and are disposed in parallel.

Figure 7:
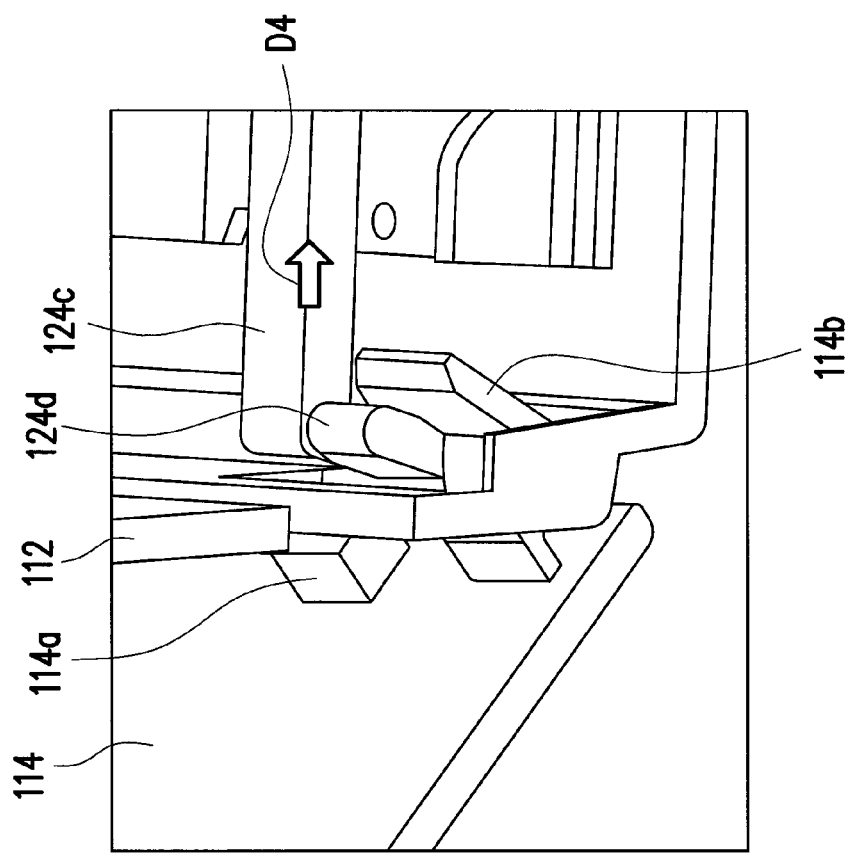
FIGS. 7 and 8 are schematic operational views of the cover being closed relative to a housing.
Figure 8:
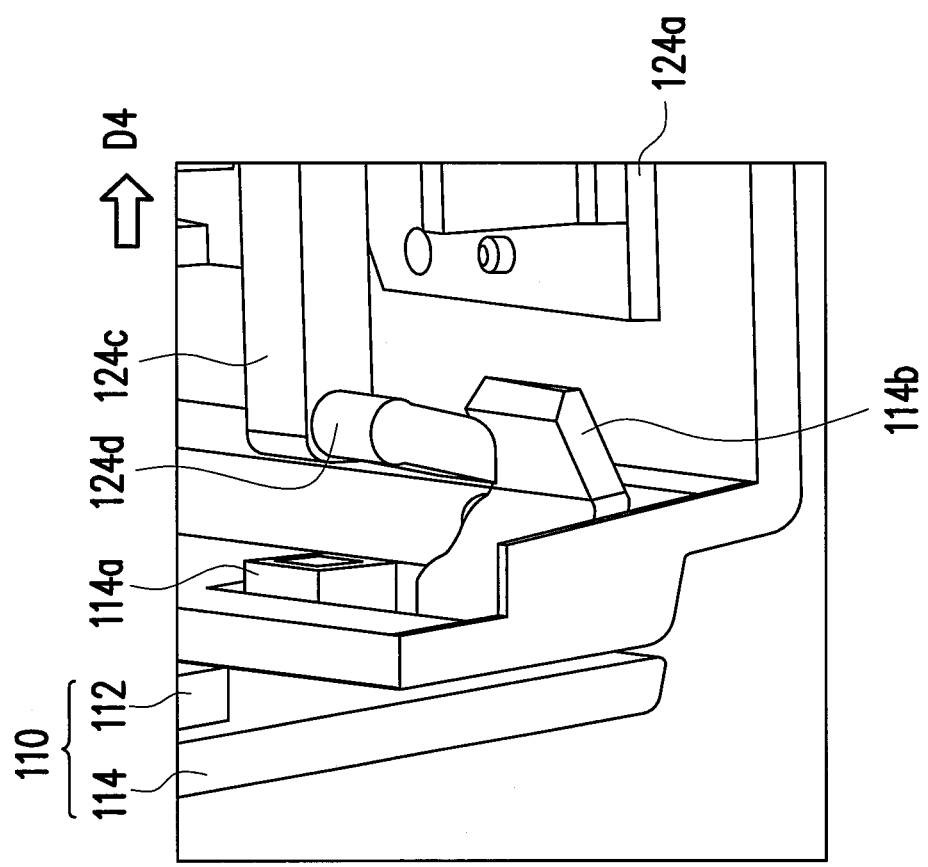

FIGS. 7 and 8 are schematic operational views of the cover being closed relative to the housing. Referring to FIGS. 6, 7 and 8, when the gear 122 rotates towards a second direction (a counterclockwise direction) D3, the driving portion 124b engaging with the gear 122 and being the gear rack makes the sliding element 124 move towards a cover closing direction D4. When the sliding element 124 moves towards the cover closing direction D4, the engaging end 124d of the driven portion 124c draws near to and props against the second protrusion 114b of the cover 114. With the movement of the sliding element 124, the protrusion against the second protrusion 114b by the engaging end 124d leads the cover to rotate, thereby making the cover 114 be closed relative to the housing 112, as shown in FIG. 1.

Referring to FIG. 1, the multifunctional printer 100 further includes an axle rod 130 disposed in the housing 112, and the gear 122 is disposed at an end of the axle rod 130. In addition, the multifunctional printer 100 further includes a pen cap 140, and the pen cap 140 may be disposed on the body portion 124a. In other words, the sliding element 124 is a base of the pen cap 140. When the sliding element 124 is driven by the gear 122 and moves towards the cover closing direction D4 to a predetermined position, the pen cap 140 covers a pen head of an ink cartridge (not shown) in the housing 112.

It should be noted that the pen cap 140 has to move with the operation of the ink cartridge originally. Integrating the driven portion 124c which makes the cover 114 be opened or closed relative to the housing 112 with the base (i.e., the sliding element 124) of the pen cap 140 not only spares the need of disposing other additional elements for use (such as gears, push rods and sliding elements) for the opening or closing cover device 120 by using original elements in the multifunctional printer, but also makes room in the housing 112. In short, the multifunctional printer achieves the function of automatically opening and closing the cover under the condition that costs are effectively controlled and that there is enough room in the housing for element disposition.

[Second Embodiment]

The present embodiment is approximately identical to the first embodiment, and the same or similar elements are represented by the same or similar reference numerals. In addition, only the difference between the present embodiment and the first embodiments is described below, while similarities therebetween are omitted.

Figure 9:
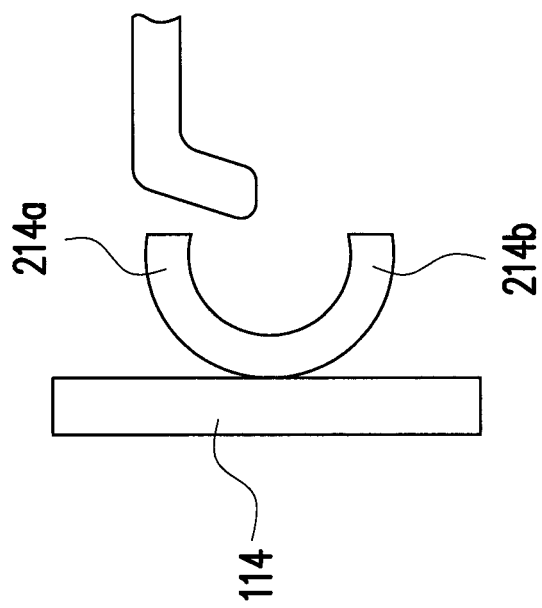
FIG. 9 is a schematic partial view of a multifunctional printer according to the second embodiment of the invention.

FIG. 9 is a schematic partial view of a multifunctional printer according to the second embodiment of the invention. Referring to FIG. 9, a first protrusion 214a and a second protrusion 214b form a "C" shape. Based on FIG. 9, when the cover 114 is closed relative to the housing 112 (shown in FIG. 1), the open end of the "C" shape formed by the first protrusion 214a and the second protrusion 214b faces the inner of the housing 112 (shown in FIG. 1).

[Third Embodiment]

The present embodiment is approximately identical to the first embodiment, and the same or similar elements are represented by the same or similar reference numerals. In addition, only the difference between the present embodiment and the first embodiments is described below, while similarities therebetween are omitted.

Figure 10:
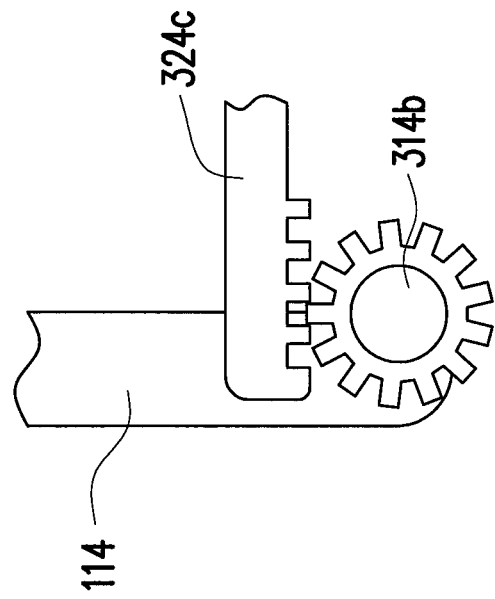
FIG. 10 is a schematic view of a multifunctional printer according to the third embodiment of the invention.

FIG. 10 is a schematic view of a multifunctional printer according to the third embodiment of the invention. Referring to FIG. 10, in the multifunctional printer of the present embodiment, a driven portion 324c is a gear rack, and a second protrusion 314b is a gear disposed on a rotation axle center of the cover 114, and the second protrusion 314b being a gear engages with the driven portion 324c being a gear rack. With the cooperation of the gear rack and the gear, the cover 114 may be closed relative to the housing 112 (shown in FIG. 1).

Based on the above, in the multifunctional printer of the invention, the disposition of the automatically opening or closing cover device enables the cover to be opened or closed automatically relative to the housing, which is an effect (automatically closing the cover) the conventional multifunctional printers cannot achieve. Furthermore, the integration of the automatically opening or closing cover device with the pen cap not only spares the need of using other additional elements by using original elements in the multifunctional printer, thereby controlling costs effectively, but also makes room in the housing so that other elements have enough room for disposition.

Although the invention has been described with reference to the above embodiments, they are not intended to limit the invention. It is apparent to people of ordinary skill in the art that modifications and variations to the invention may be made without departing from the spirit and scope of the invention. In view of the foregoing, the protection scope of the invention will be defined by the attached claims.

What is claimed is:

1. A multifunctional printer, comprising:
    a main body comprising a housing and a cover pivoted to the housing, wherein the housing has an opening, the cover has a first protrusion and a second protrusion which protrude to an interior of the housing and are located in the opening;
    an automatically opening or closing cover device disposed in the main body, comprising:
    a gear; and
    a sliding element comprising a body portion, a driving portion and a driven portion, wherein the driving portion and the driven portion are disposed on opposite sides of the body portion, and the driving portion engages with the gear,
    when the gear rotates towards a first direction, the driving portion is driven by the gear and makes the sliding element move towards a cover opening direction, and the driven portion of the sliding element props against the first protrusion of the cover is opened relative to the housing while an enraging end of the driven portion is located between the first protrusion and the second protrusion, the engaging end contacting neither the first protrusion nor the second protrusion, and
    when the gear rotates towards a second direction, the driving portion is driven by the gear and makes the sliding element move towards a cover closing direction, and the engaging end of the driven portion props against and latches with the second protrusion of the cover, and
    along with the movement of the driven portion towards the cover closing direction, the cover is driven to be closed relative to the housing.

2. The multifunctional printer according to claim 1, wherein the driving portion is a gear rack, and the driven portion is a push rod.

3. The multifunctional printer according to claim 1, wherein the first protrusion and the second protrusion form a "C" shape.

4. The multifunctional printer according to claim 1, wherein the driven portion is a gear rack, and the second protrusion is a gear.

5. The multifunctional printer according to claim 1, further comprising an axle rod disposed in the housing, the gear being disposed at an end of the axle rod.

6. The multifunctional printer according to claim 5, further comprising a pen cap disposed on the body portion, wherein when the sliding element is driven by the gear and moves towards the cover closing direction to a predetermined position, the pen cap covers an ink cartridge.

7. An automatically opening or closing cover device suitable for being applied in a multifunctional printer comprising a main body, the automatically opening or closing cover device comprising:
    a gear; and
    a sliding element comprising a body portion, a driving portion and a driven portion, wherein the driving portion and the driven portion are disposed on opposite sides of the body portion, and the driving portion engages with the gear,
    wherein when the gear rotates towards a first direction, the driving portion is driven by the gear and makes the sliding element move towards a cover opening direction, and the driven portion of the sliding element props against the a first protrusion of a cover of the main body that the cover is opened relative to a housing of the main body while an engaging end of the driven portion is located between the first protrusion and the second protrusion, the engaging end portion contacting neither the first protrusion nor the second protrusion, and
    when the gear rotates towards a second direction, the driving portion is driven by the gear and makes the sliding element move towards a cover closing direction, and the engaging end of the driven portion props against and latches with a second protrusion of the cover, and along with the movement of the driven portion towards the cover closing direction, the cover is driven to be closed relative to the housing.

8. The automatically opening or closing cover device according to claim 7, wherein the driving portion is a gear rack, and the driven portion is a push rod.

9. The automatically opening or closing cover device according to claim 7, wherein the first protrusion and the second protrusion form a "C" shape.

10. The automatically opening or closing cover device according to claim 7, wherein the driven portion is a gear rack, and the second protrusion is a gear.

* * * * *